US008731510B2

(12) United States Patent
Thiebaut et al.

(10) Patent No.: US 8,731,510 B2
(45) Date of Patent: May 20, 2014

(54) METHOD FOR TRANSMITTING URGENT ALERT MESSAGES TO SETS OF MOBILE TERMINALS LOCATED IN CELLS OF A RADIO COMMUNICATION NETWORK, AND RELATED RADIO NETWORK CONTROLLER

(75) Inventors: Laurent Thiebaut, Antony (FR); Rene Raynaud, Jouy en Josas (FR)

(73) Assignee: Alcatel Lucent, Paris (FR)

( * ) Notice: Subject to any disclaimer, the term of this patent is extended or adjusted under 35 U.S.C. 154(b) by 1162 days.

(21) Appl. No.: 12/063,194

(22) PCT Filed: Jul. 20, 2006

(86) PCT No.: PCT/FR2006/050736
§ 371 (c)(1),
(2), (4) Date: Feb. 7, 2008

(87) PCT Pub. No.: WO2007/028914
PCT Pub. Date: Mar. 15, 2007

(65) Prior Publication Data
US 2010/0279646 A1 Nov. 4, 2010

(30) Foreign Application Priority Data

Aug. 10, 2005 (EP) .................................... 05300660

(51) Int. Cl.
*H04M 11/04* (2006.01)
*H04W 4/00* (2009.01)
(52) U.S. Cl.
USPC ........................................ 455/404.1; 455/466
(58) Field of Classification Search
CPC ................................................. H04M 2242/04
USPC .............................. 455/4.1, 412.2, 466, 404.1
See application file for complete search history.

(56) References Cited

U.S. PATENT DOCUMENTS 6,175,743 B1 * 1/2001 Alperovich et al. .......... 455/466
6,366,780 B1 * 4/2002 Obhan .......................... 455/453

(Continued)

FOREIGN PATENT DOCUMENTS

WO    WO 2004/012470 A1    2/2004

OTHER PUBLICATIONS

"Digital cellular telecommunications system (Phase 2+); Universal Mobile Telecommunications System (UMTS); Technical realization of Cell Broadcast Service (CBS) (3GPP TS 23.041 version 5.2.0 Release 5); ETSI TS 123 041", ETSI Standards, European Telecommunications Standards Institute, Sophia-Antipo, France, vol. 3-T2, No. V520, Dec. 2003, XP014016439.

(Continued)

*Primary Examiner* — Huy C Ho
(74) *Attorney, Agent, or Firm* — Fay Sharpe LLP

(57) ABSTRACT

The invention concerns a radio network controller (BSCI), for a radio access communication network, comprising processing means (MT), upon receiving from an alarm center (CA) a message of a first SMS-CB type associated with a selected class of alarm of a selected level, containing an alarm text message addressed to mobile terminals (T) located in at least one selected cell controlled thereby, for interrupting transmission to the mobile terminals, located in each selected cell, of any message of SMS-CB type associated with a class of level lower than that of the selected alarm class, and optionally all other communication of said terminals (for example, telephone calls thereof), so that the first message may be broadcast to the mobile terminals which are located in each selected cell controlled thereby and so that some at least of said mobile terminals should transmit an alarm signal (for example radio) and display the alarm text message contained in the first message.

17 Claims, 1 Drawing Sheet

(56) References Cited

U.S. PATENT DOCUMENTS

| | | | |
|---|---|---|---|
| 2003/0143974 A1* | 7/2003 | Navarro | 455/404 |
| 2004/0008723 A1* | 1/2004 | Uchida et al. | 370/466 |
| 2004/0203622 A1* | 10/2004 | Esque et al. | 455/412.1 |
| 2005/0176445 A1* | 8/2005 | Qu et al. | 455/458 |
| 2006/0049934 A1* | 3/2006 | Breen | 340/531 |
| 2008/0261554 A1* | 10/2008 | Keller et al. | 455/404.1 |

OTHER PUBLICATIONS

"Smart cars; Card Application Toolkit (CAT) (Release 50; ETSI TS 102 223" ETSI Standards, European Telecommunications Standards Institute, Sophia-Antipo, France, vol. SCP-WG3, No. V580, Dec. 2004, XP014027305.

* cited by examiner

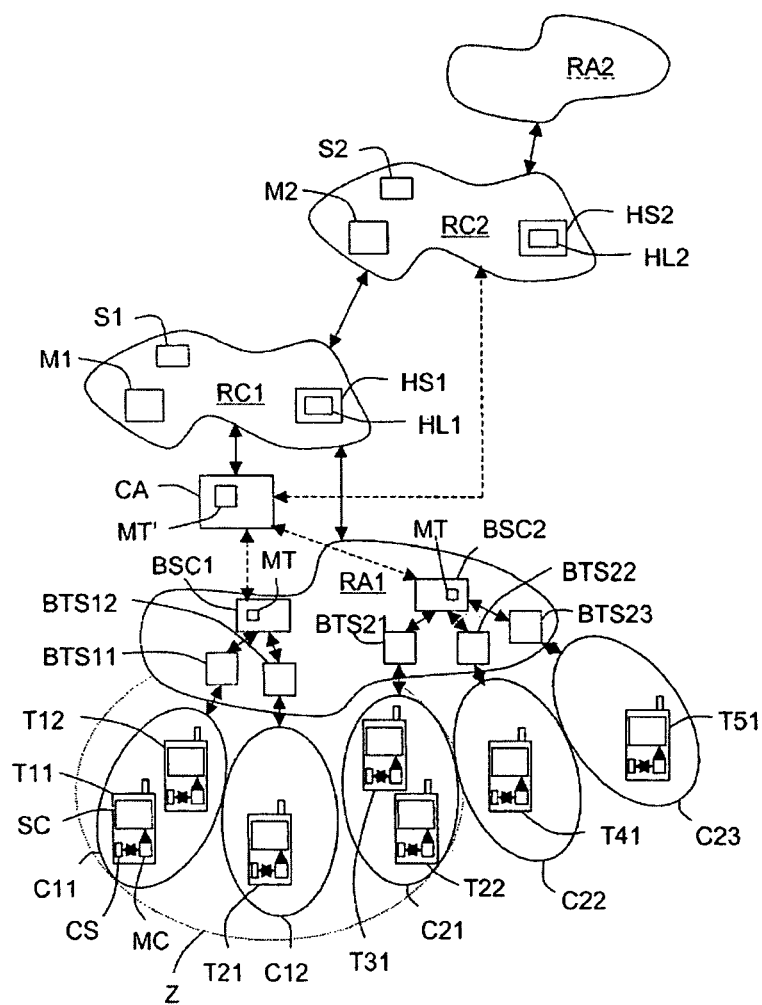

METHOD FOR TRANSMITTING URGENT ALERT MESSAGES TO SETS OF MOBILE TERMINALS LOCATED IN CELLS OF A RADIO COMMUNICATION NETWORK, AND RELATED RADIO NETWORK CONTROLLER

The invention relates to radio mobile (or cellular) communication networks and more precisely transmission of urgent alarm messages to mobile communication terminals attached to such networks.

For the purposes of this description, a "mobile communication terminal" means any mobile (or cellular or portable) radio communication equipment capable of connecting to a mobile radio network through a radio access network so as to exchange data in the form of signals with another equipment. For example, it may relate to a mobile telephone, or a portable computer or a personal digital assistant (PDA) equipped with a radio communication module.

In some emergency situations, for example such as forecasting of an imminent natural or non-natural catastrophe in a given geographic zone, it is very important to alert as many people present in this geographic zone as possible so that they can attempt to move as far away from it as possible.

To achieve this, it is possible to transmit short text, known as SMS (Short Message System) messages to mobile terminal users, without monopolizing too many resources. More precisely, and as those skilled in the art are well aware, it is possible to send either point-to-point type SMS messages (in other words addressed to a specific and identified user) like those defined in specification 23.040 of the 3GPP, or CB type SMS messages ("SMS-CB" for SMS-Cell Broadcast service) as defined in the 3GPP specification 23.041, to mobile terminals.

Note that SMS-CB type short messages provide a service that is similar to the service provided by the "Teletext" service accompanying television programs. It can be used to broadcast short SMS-CB type messages without an acknowledgement of reception to sets of mobile terminals located in chosen radio cells (called broadcasting cells) in at least one geographic area (or even an entire PLMN type network). This broadcasting is done through the radio access network of the mobile network, and more precisely using each radio network controller controlling radio communications in at least one of the broadcasting radio cells.

In the case of short SMS type point-to-point messages, the radio access network must firstly determine the identifiers of subscribers whose mobile terminals are located in each broadcasting radio cell, so as to be able to transmit said short messages (point-to-point SMSs) to them. The radio network controllers of the radio access networks only keep a trace of subscribers in communication, and consequently the determination of subscribers located in radio cells in which the alarm message broadcast is:

either imprecise because it is done in the network core (for example by the equipment called the MSC (Mobile Service Switching Centre) or the equipment called the SGSN (Serving GPRS Support Node), in other words at geographic zones defined for the specific needs of the mobile network, such as "Location Areas" (groups of cells) or "Routing Areas", and therefore not defined for the needs of an emergency situation for which users are to be alerted, or complicated because new interfaces have to be defined involving the emergency messages manager, nodes of the mobile core network (for example the MSC or the SGSN), radio network controllers and terminals to determine the identifiers of users with mobile terminals located in the cells in the alert zone(s) concerned by the urgent notification.

Point-to-point SMSs then have to be stored and then transmitted, so that they are not really appropriate for massive transmissions in real time. Furthermore, it may take a relatively long time to contact a user whose terminal is provisionally attached to a visited radio access network that is not the network to which he belongs (a "roaming" situation). It is necessary that the network that sends the alarm message (in other words the "visited" network in which the subscriber to be contacted is located), contacts the HLR (Home Location Register) equipment of the network to which the user (subscriber) of this terminal belongs, to determine his home node (for example the MSC or the SGSN), and then return to transmit the point-to-point SMS to him using his visited radio access network. This may take a relatively long time, and is therefore incompatible with transmission of an urgent alarm message, particularly if this procedure has to be implemented for all mobile terminals located in the alert zone.

In the case of a transmission of short SMS-CB type messages, the mobile terminals (existing) that receive them can only display their contents without being able to alert their users. Consequently, if the user's terminal is on standby (or so-called "idle" mode), its user can only know that a message has been transmitted to him if he accidentally looks at the screen of his mobile terminal, or if he decides to use said mobile terminal. Furthermore, if the mobile terminal is used for a voice communication (for example of the GSM type), he is not in a position to receive the SMS-CB message considering that a mobile terminal engaged in a communication cannot simultaneously listen to the radio channel dedicated to this communication and the radio channel carrying the SMS-CB message.

There is no known solution that is fully satisfactory, therefore the purpose of the invention is to improve the situation and particularly to enable transmission of urgent alarm messages, in other words practically in real time.

To achieve this, it proposes a method dedicated to transmission of urgent alarm messages in a radio communication network comprising a radio access network controlling communications of mobile terminals located in radio cells.

This method includes the following steps:

a) generate a first SMS-CB type message in an alarm centre, associated with a chosen alarm class of a chosen level, containing an alarm text message and addressed to mobile terminals located in at least one chosen cell (in at least one alert zone), b) transmit this first message to the radio access network, c) use the radio access network to interrupt the transmission of any SMS-CB type message associated with a lower level class than the chosen alarm class, to mobile terminals located in each chosen cell, d) broadcast the first message to mobile terminals located in each chosen cell, using the radio access network (these are essentially terminals in idle mode that can receive this type of SMS-CB message), and e) send an alarm signal and display an alarm text message on each mobile terminal that received the first message.

The method according to the invention may comprise other characteristics that may be taken separately or in combination and particularly:

in the presence of a mobile terminal comprising a SIM (Subscriber Identification Module) type identification card designed to take control by means of specific commands, in step e) the terminal can transmit any first received message (of the SMS-CB type) to its identification card so that the card generates specific commands that will order its terminal to send the alarm signal and to display the alarm text message. This option makes it unnecessary to modify the terminal to support reception of the (first) urgent alarm messages through SMS-CB;

if a first message (of the SMS-CB type) is received by a mobile terminal while setting up a voice communication, the alarm audio signal is superposed onto the down audio link if there is one, in step e);

if a first message (of the SMS-CB type) is received by a mobile terminal that has not initiated setting up of a voice communication, the alarm audio signal is emitted using the terminal sound broadcasting means, in step e) (for example using its loudspeaker);

steps a) to e) can be reiterated a chosen number of times (preferably under the control of the alarm centre and using the classical SMS-CB procedure between the alarm centre and the radio access network);

for the first attempt to transmit a first SMS-CB message, the radio access network can be used in step c) to release all radio resources used by the mobile terminals involved in a communication and located in each chosen cell, so as to force these mobile terminals to change to idle mode. This forced release of radio resources is preferably implemented only during the first attempt to transmit a first SMS-CB type message, because it could subsequently interrupt communications between members of rescue and-or emergency teams located in the alert zone(s);

for the case in which the attempt to transmit a first SMS-CB message fails (for mobile terminals that are not in idle mode (in other words that have setup a communication with the network) and that are located in the chosen cell(s)), the radio access network can be used in step f) to determine the first (radio) identifiers for each of these mobile terminals, and then in step g) a second point-to-point SMS type message is generated containing an alarm text message starting from the first message, and in step h) this second message is transmitted to each detected mobile terminal so that the alarm text message contained in it can be displayed on its screen, in step g), the radio access network can transmit the first identifiers of subscriber terminals that cannot be reached by the SMS-CB procedure (steps a) to e)) to the alarm centre, so that the alarm centre can generate a second message (of the point-to-point SMS type), then it transmits this second message to each of these terminals in step h). This requires transformation of the first (subscriber) identifier as known in the radio access network (for example the IMSI) into a second (communication) identifier used by the point-to-point SMS network and therefore viewing the client information database (for example of the HSS "Home Subscriber System") type for the network to which each terminal is attached;

as a variant, the radio access network can generate a second message (point-to-point SMS type) in step g) starting from the first message, and can then transmit this message in h) to each detected mobile terminal, after determining its second (communication) identifier;

in step h), reception of a second message (point-to-point SMS type) can be signalled by a mobile terminal that has set up a voice communication, by superposing an audio signal onto the down audio link of this voice communication;

in step h), if a second message (point-to-point SMS type) is received by a mobile terminal that has set up a communication of a type other than a voice communication, this reception can be signalled by sending an audio signal with the terminal's sound broadcasting means (for example its loudspeaker);

in the presence of a mobile terminal comprising an SIM type identification card capable of being controlled using specific commands, the mobile terminal can transmit any second received point-to-point SMS message to its identification card, so that this card generates specific commands designed to order its mobile terminal to send the alarm signal and to display the alarm text message;

in step h), the second (communication) identifiers of mobile terminals and routing information necessary to reach these mobile terminals can be determined from the client information database in a single operation, using a second point-to-point SMS type message, starting from the first (radio) identifiers of the mobile terminals (for example their IMSI).

The invention also proposes a radio network controller for a radio access network comprising processing means that, following reception (from an alarm centre) of a first SMS-CB type message associated with a chosen alarm class of a chosen level, containing an alarm text message and intended for mobile terminals located in at least one chosen cell that it controls, are required to interrupt transmission of any SMS-CB type message associated with a class with a level lower than the chosen alarm class to mobile terminals located in each chosen cell, so that this first message can be broadcast to the mobile terminals that are located in the chosen cells and at least some of them can emit an alarm signal and display the alarm text message contained in the first message.

The radio network controller may comprise other characteristics that may be taken separately or in combination, and particularly:

its processing means may for example be required to resend a first message a chosen number of times:

for the first attempt to send a first SMS-CB message, its processing means may for example be required to release all radio resources used by the mobile terminals involved in a communication and located in each chosen cell that it controls, so as to force these mobile terminals to change to idle mode;

for the case in which the attempt to transmit a first SMS-CB message failed (for mobile terminals that are not in idle mode—in other words terminals that have setup a communication with the network—and that are located in the chosen cell(s) that it controls), its processing means may for example be required to determine the first identifiers of subscriber terminals that cannot be reached by the SMS-CB procedure, and then transmitting these first identifiers to the alarm centre so that it generates a second message (of the point-to-point SMS type) and that it transmits this second message to each of these terminals, after determining their second communication identifier starting from their first identifier;

as a variant, its processing means may for example be required to determine the first (radio) identifiers for each of these mobile terminals, and then to generate a second point-to-point SMS type message containing an alarm text message starting from the first message, and then determining the second communication identifier of each of these mobile terminals starting from their first identifiers, and transmitting the second message to each detected mobile terminal so that the alarm text message contained in it can be displayed on its screen.

The invention also proposes an alarm centre comprising processing means that transmit a first SMS-CB type message to the chosen radio network controllers of the type mentioned above, and on reception of first (radio) identifiers of mobile terminals that could not be reached by the first SMS-CB type message from at least one of these radio network controllers, generate a second point-to-point SMS type message and then transmits this message to each of the mobile terminals that have not be reached, after having determined the second point-to-point SMS communication identifiers for these mobile terminals starting from their first corresponding radio identifiers.

Other characteristics and advantages of the invention will become clear after reading the detailed description given below and the appended drawing on which the single FIGURE very diagrammatically illustrates two mobile radio networks coupled to each other, the first comprising a second mobile radio network comprising example embodiments of the radio network controller according to the invention. The appended drawing can be used not only to complete the invention, but also to contribute to its definition if necessary.

The purpose of the invention is to transmit alarm messages urgently, in other words practically in real time, to mobile (or cellular) communication terminals attached to mobile communication networks (or cell networks).

In the following, we will assume that the mobile communication terminals are mobile (or cellular) phones, as a non-limitative example. But the invention is not limited to this type of mobile terminal. It relates to any type of mobile radio (or cellular or portable) communication equipment capable of connecting to a mobile radio network through a radio access network, so as to exchange data with other equipment in the form of signals. In particular, it may be a portable computer or a personal digital assistant (PDA) on which a radio communication module is fitted.

The invention relates to any type of mobile (or cellular) communication network of the PLMN type, either of the 2G type such as GPRS/GSM networks or the 2.5G type such as GPRS/EDGE networks or the 3G type such as UMTS networks, or if it is one of their equivalents.

In the non-limitative example illustrated in the single FIGURE, the example shows two mobile (communication) networks coupled to each other. But the invention is not limited to this example. It is applicable to all situations involving at least one mobile network.

In the following, we will consider that the two mobile networks are GSM type networks, as an illustrative example. But it be different types of mobile networks.

As illustrated on the single FIGURE, a mobile (or cellular) network may very diagrammatically be summarized as a GPRS Core Network $RC_i$ coupled to an $RA_i$ radio access network (called a BSS), although this is quite sufficient to understand the invention. In this case the network index i is equal to 1 or 2.

The radio access network $RA_i$ comprises base stations $BTS_{jk}$ and radio network controllers $BSC_j$ connected to each other through a private transport network. In the non-limitative example illustrated, the first radio access network RA1 comprises a first radio network controller BSC1 (j=1) connected to two base stations BTS11 (j=1, k=1) and BTS12 (j=1, k=2), and a second radio network controller BSC2 (j=2) connected to three base stations BTS21 (j=2, k=1), BTS22 (j=2, k=2) and BTS23 (j=2, k=3).

Each base station $BTS_{jk}$ is associated with at least one logical cell $C_{jk}$ covering a radio zone in which mobile terminals $T_{ni}$ can setup (or continue) radio links. In the non-limitative example illustrated, two mobile terminals T11 (n=1, i=1) and T12 (n=1 and i=2) are located in a first cell C11 attached to the base station BTS11, a mobile terminal T21 (n=2, i=1) is located in a second cell C12 attached to the base station BTS12, two mobile terminals T31 (n=3, i=1) and T22 (n=2 and i=2) are located in a third cell C21 attached to the base station BTS21, a mobile terminal T41 (n=4, i=1) is located in a fourth cell C22 attached to the base station BTS22, and a mobile terminal T51(n=5, i=1) is located in a fifth cell C23 attached to the base station BTS23. In this case, the mobile terminals $T_{n1}$ belong to users who are clients of the first network (RC1, RA1). Therefore they are momentarily attached to their home network. On the other hand, the mobile terminals $T_{n2}$ belong to users who are clients of the second network (RC2, RA2). Therefore they are momentarily in a so-called "roaming" situation, because they are attached to a (first) visited site (RC1, RA1) different from their (second) home network (RC2, RA2).

The radio network controllers $BSC_j$ are required to manage allocation of resources or logical channels of the network (such as radio link channels or channelling codes) in order to setup services between mobile terminals $T_{ni}$ and core networks $RC_i$. A service is for example a connection that can be used for transmission of data between a mobile network and a mobile terminal $T_{ni}$, or for a voice communication (telephone call), or for transmission of a short point-to-point SMS or SMS-CB type message.

Each core network $RC_i$ comprises network equipment connected to radio network controllers $BSC_j$ and other external communication networks (public and/or private), for example such as the Internet network. In particular, this enables clients of a mobile network firstly to access terminals or external servers using their own mobile terminals, and secondly to access their home mobile network through the radio access network of a visited mobile network.

The connection to an external network is made by a GGSN (Gateway GPRS Support Node) type router or node, usually under the control of an SGSN type (Serving GPRS Support Node) type node $S_i$.

Each core network $RC_i$ also includes a call management centre (MSC for "Mobile Service Switching Centre) $M_i$ required to manage circuit (or CS) type communication (or call) switching. In particular, this MSC centre processes procedures for changing cells or 'handovers". It is connected to a subscription database called HLR (Home Location Register) $HL_i$, that usually forms part of a Home Subscriber Server (HSS) $HS_i$, so as to retrieve information about subscribers (or clients) and store the known addresses and positions of said subscribers. Furthermore, the MSC centre comprises a memory (or database) called the VLR (Visitor Location Register) in which it stores data related to each terminal $T_{ni}$ connected to its radio access network $RA_i$.

In order to enable transmission of urgent alarm messages to mobile terminals $T_{ni}$ located in at least one chosen cell $C_{jk}$ in the case of a forecast natural or other imminent catastrophe in at least one given geographic zone Z at least partly containing each chosen cell $C_{jk}$, the invention proposes to connect at least one alarm centre CA to at least one of the mobile networks (in this case the second) and to include a processing module MT in each radio network controller $BSC_j$.

The alarm centre CA comprises a processing module MT' that, whenever an alarm related to a forecast of an imminent catastrophe is detected (for example like an earthquake, a tsunami, a tornado, a volcanic eruption, a risk of explosion or of pollution), is required to generate a first SMS-CB type (Short Message System-Cell Broadcast service—defined by the 3GPP specification 23-041) short message associated with a chosen alarm class with a chosen priority level containing an alarm text message and to be sent to mobile terminals $T_{ni}$ located in at least one given geographic zone Z, at least partly containing one or several chosen cells $C_{jk}$. In the non-limitative example illustrated in the single FIGURE, the geographic zone Z encompasses the two cells C11 and C12 attached to the first radio network controller BSC1 of the radio access network RA1 of the first mobile network, and cell C21 attached to the second radio network controller BSC2 of said radio access network RA1.

For the purposes of this description, an "alarm text message" refers to one or several phrases and/or a dedicated icon. In the case of multilingual and/or touristic countries, each phrase may for example be in different languages to take account of roamers from other countries, and for example one of the phrases may always be in English.

Therefore, the invention associates a priority level with each SMS-CB type short message class, so that one class, for example alarm, has priority over one or several other classes (alarm or other).

The alarm centre CA transmits each first SMS-CB type short message that it has generated to each radio network controller (in this case BSC1 and BSC2) controlling at least one of the cells Cjk in which it must be broadcast to the mobile terminals Tni that are momentarily attached to it.

When a radio network controller (BSC1 or BSC2) receives a first short message (of the SMS-CB type), it transmits it to its processing module MT, if this SMS-CB message class is an alarm class.

Then the processing module MT of the radio network controller (for example BSC1) immediately interrupts the transmission of each SMS-CB type short message associated with an alarm class with a lower priority level than the priority level of the chosen alarm class of the first received SMS-CB message, to the mobile terminals Tni located in each chosen cell Cjk that it controls. This releases resources for the broadcast of the first alarm messages (SMS-CB).

Consequently, the network operator can configure the processing module MT of the radio network controller (for example BSC1) so as to interrupt the transmission of each SMS-CB type message associated with a class with a priority level lower than the priority of the chosen alarm class, to the mobile terminals Tni located in each chosen cell Cjk. It could also be possible to define priority sub-levels within an alarm class with a chosen priority level. In this case, the network operator can configure the processing module MT of the radio network controller (for example BSC1) so as to interrupt the transmission of any SMS-CB type message associated with a lower priority level class than the chosen alarm class, to mobile terminals Tni located in each chosen cell Cjk, and within this chosen alarm class to interrupt the transmission of any SMS-CB type message associated with a lower priority sub-level than a chosen sub-level, to mobile terminals Tni located in each chosen cell Cjk.

The processing module MT of the radio network controller BSC1 then broadcasts the first message to all mobile terminals Tni (in this case T11, T21 and T12) located in the chosen cells C11 and C12 that it controls (and that form part of the geographic zone Z). Note that the processing module MT of the radio network controller BSC2 also broadcasts the first message to all mobile terminals Tni (in this case T31 and T22) located in the chosen cell C21 that it controls (and that also forms part of the geographic zone Z).

It is important to note that most mobile terminals Tni in idle mode are terminals capable of receiving the first SMS-CB type message.

When a mobile terminal Tni receives the first message, it analyses its content. Since said content requires the transmission of an alarm and display of an alarm text message on the SC screen of the mobile terminal Tni, the mobile terminal executes it.

Note that mobile terminals Tni, for example mobile telephones, normally comprise a control module MC coupled to an SIM (Subscriber Identification Module) type identification card CS. When this CS SIM card satisfies a standard such as SAT ("SIM Application Toolkit") defined by the 3GPP specification 31.111 or 11.14, it can at least partially control the control module MC by means of specific commands.

Consequently, when a mobile terminal Tni equipped with a CS SIM type card satisfying a SAT type standard receives a first message, it sends it to its CS SIM type card, that then takes control over its control module MC by transmitting specific commands to it, for example such as "DISPLAY TEXT" and "PLAY TONE" that order it to send the alarm and display the alarm text message on the screen SC of its mobile terminal Tni.

Use of the DISPLAY TEXT command enables the CC SIM type card to define a display priority level and a particular display format for the alarm text message. For example, an alarm text message associated with a high level priority is displayed on the screen SC to replace any other text currently being displayed or in a window superposed above a text currently being displayed or one or several windows.

The means used to send the alarm signal and the alarm text message display mode depend on the state of the mobile terminal Tni. Two cases can be envisaged, depending on whether or not the mobile terminal Tni initiated setting up a voice communication.

If the mobile terminal Tni is currently setting up a voice communication, then the CS SIM type card orders the control module MC to superpose the audio alarm signal onto the down audio link, if there is one. The terminal user is then alerted by the sound broadcasting means of the mobile terminal Tni, for example the loudspeaker or the loudspeaker of a "hand off" kit, or an earphone coupled to the mobile terminal Tni. The alarm text message may for example be displayed on the screen SC above or instead of the calling number and/or the called number.

If the mobile terminal Tni is not currently setting up a voice communication, then the control module MC sends firstly the audio alarm signal with the sound broadcasting means of the mobile terminal Tni, for example its loudspeaker or the loudspeaker of a "hands-free" kit, or an earphone coupled to the mobile terminal Tni, and secondly at approximately the same time displays an alarm text message on the screen SC.

If a mobile terminal Tni receives a first message but it is not equipped with a CS SIM type card satisfying a SAT type standard, it transmits it to its control module MC so that it can process it.

It is important to note that the same first message (of the SMS-CB type) may be transmitted to mobile terminals Tni a chosen number of times (for example five or six times) by the radio network controller(s) BSCj concerned. These successive transmissions may for example be made every minute or every 30 seconds.

Furthermore, in one variant it would be possible for the processing module MT of each radio network controller BSCj to be designed so as to release all radio resources used by the mobile terminals involved in a communication and located in each chosen cell Cjk controlled by its control BSCj, during a first attempt to send a first SMS-CB message to the mobile terminals Tni.

Due to this release mechanism, the mobile terminals are obliged to change to idle mode, in which they are capable of receiving a first message (of the SMS-CB type).

It is preferable to only implement this forced release of radio resources during each first transmission attempt of a first message. If this mechanism was applied systematically, communications between members of rescue and/or emergency teams located in the alert zone(s) could be interrupted.

The steps that have been described above are capable of transmitting a first alarm message (type SMS-CB) essentially only to mobile terminals Tni in idle mode. For terminals that are not in idle mode (in other words terminals that have setup a communication with the network (dedicated mode)), the first attempt to transmit a first SMS-CB message failed. The invention proposes to apply a complementary steps so as to alert them nevertheless.

To achieve this, the processing module MT is required to determine a first subscriber radio identifier for each mobile terminal Tni that did not receive the first message. The first identifiers are known to the radio network controller (for example BSC1). It received them from a node in the core network. For example, it is the international identifier of a mobile subscriber called IMSI (for "International Mobile Station Identity").

Once the processing module MT of a radio network controller (for example BSC1) has the first identifiers of the mobile terminals Tni concerned by the second situation, at least two embodiments may be envisaged so as to transmit a second point-to-point SMS type message containing an alarm text message to be displayed on their screen SC.

In a first embodiment, each processing module MT is designed so as to transmit the first identifiers that it determined to the alarm centre CA. The alarm centre is then required to determine a second communication identifier for each mobile terminal Tni designated by a first received identifier with the client information database (for example of the HSS type) HSi for its attachment network. For example, each second communication identifier is what those skilled in the art call MSISDN (for "Mobile station ISDN-ISDN type number of the mobile subscriber, for example such as 06 81 88 76 58).

In order to optimize sending second messages to the mobile terminals Tni, it is possible to define a new MAP (Mobile Application Part) type operation, to determine the second communication identifiers of said mobile terminals Tni with routing information so that they can be reached through a point-to-point SMS, in a single operation. Note that MAP type interfaces can be used to obtain services from HLR HLi memories contained in the HSS HSi servers.

Once the processing module MT' of the alarm centre CA is in possession of the second communication identifiers (for example MSISDNs) of mobile terminals Tni, it generates and transmits a second message to each of them. The second message that is used in the second situation is a short point-to-point SMS type message that essentially comprises an alarm text message that will be displayed on the screen SC of each receiving mobile terminal.

In a second embodiment, the processing module MT of each radio network controller BSCj is designed so as to generate a second message from data representing the alarm text message contained in the first received message. As in the first case, the second message is a short point-to-point SMS type message that essentially comprises an alarm text message designed to be displayed on the screen SC of each destination mobile terminal Tni. Once the second message has been generated, the processing module MT transmits it to each mobile terminal Tni for which it has determined the second communication identifier in a manner similar to that for the alarm centre CA.

In the first embodiment and also in the second embodiment, when a mobile terminal Tni receives a second message, it processes it like any other point-to-point SMS type short message. Consequently, its arrival may be notified to the user by an audio signal, possibly superposed onto a down audio link of the voice communication in progress. To do this, the mobile terminal Tni uses sound broadcasting means, for example its loudspeaker or the loudspeaker of a "hands-free" kit or an earphone.

The user should then use the menu of his mobile terminal Tni to display the alarm text message on the screen SC.

The processing module MT of the radio network controllers BSCj according to the invention may be produced in the form of electronic circuits, software modules (or computer modules) or a combination of circuits and software.

The invention has a number of advantages compared with solutions according to prior art and particularly:
- the use of SMS-CB type short messages in the first situation can very quickly reach mobile terminals and requires very few resources, thus leaving resources available for essential and/or priority communications,
- users whose mobile terminals receive SMS-CB type short messages are now alerted about the arrival of such messages by a sound alarm signal,
- no adaptation or modification of mobile terminals needs to be made if their SIM type card satisfies a SAT type standard,
- send point-to-point SMS type short messages in the second situation to a restricted number of mobile terminals so as not to saturate network signalling capacities, and therefore to enable their routing in short times,
- since point-to-point SMS type short messages can be transmitted to mobile terminals even if they have already setup a voice communication or a GPRS data transfer, their addressees cannot miss them.

The invention is not limited to embodiments of the radio network controller BSCj and the alarm message transmission method described above solely as an example, but it encompasses all variants that those skilled in the art might consider within the framework of the claims described below.

The invention claimed is:

1. A method for transmitting alarm messages in a radio communication network comprising a radio access network controlling mobile terminal communications located in radio cells, the method comprising:
   said radio access network receiving a first short message service-cell broadcast (SMS-CB) type alarm message from an alarm center, associated with a chosen alarm class of a chosen level, containing an alarm text message and addressed to mobile terminals located in at least one chosen cell;
   using a processing module in a radio network controller in said radio access network to immediately interrupt the transmission of at least one SMS-CB type message associated with a lower level class than said chosen alarm class of the first received SMS-CB message, to mobile terminals located in at least one chosen cell, and releasing resources for a broadcast of the first alarm message,
   broadcasting said first message to mobile terminals located in at least one chosen cell, using the radio access network, and
   sending an audio alarm signal and display an alarm text message on at least one mobile terminal that received said first message.

2. The method according to claim 1, wherein in the presence of a mobile terminal comprising a SIM type identification card configured to take control by with specific commands, said mobile terminal transmits said first received message to said identification card, so that this card generates specific commands that will order its mobile terminal to send said audio alarm signal and to display said alarm text signal.

3. The method according to claim 1, wherein if a first message is received by a mobile terminal while setting up a voice communication, said audio alarm signal is superposed onto a down audio link if there is one.

4. The method according to claim 1, wherein if a first message is received by a mobile terminal that has not initiated setting up a voice communication, said audio alarm signal is emitted using the mobile terminal sound broadcasting component.

5. The method according to claim 1, wherein the method can be reiterated a chosen number of times.

6. The method according to claim 1, wherein for a first attempt to transmit a first SMS-CB type message, said radio access network is used to release radio resources used by mobile terminals involved in a communication and located in at least one chosen cell, so as to force these mobile terminals to change to idle mode.

7. The method according to claim 1, wherein in the case in which an attempt to transmit a first SMS-CB type message fails for mobile terminals that have already set up a communication with said network and that are located in a chosen cell, said radio access network is used to determine the first identifiers for said mobile terminals, and a second point-to-point SMS type message is generated containing an alarm text message starting from said first message, and said second message is transmitted to at least one detected mobile terminal so that the alarm text message contained in it can be displayed on a screen of said mobile terminal.

8. The method according to claim 7, wherein said radio access network transmits said first identifiers of subscriber terminals that have set up a communication to said alarm center so that said alarm center can generate a second message of the point-to-point SMS type, then said alarm center determines a second identifier with at least one client information database for the attachment network of each mobile terminal designated by a first identifier, and in that said alarm center transmits said second message to at least one mobile terminal (Tni) designated by a second identifier.

9. The method according to claim 7, wherein said radio access network determines a second identifier with at least one client information database for the attachment network of at least one mobile terminal designated by a first identifier, then transmits said second message to at least one mobile terminal designated by a second identifier.

10. The method according to claim 7, wherein in the presence of a mobile terminal comprising a SIM type identification card configured to take control by with specific commands, said mobile terminal transmits at least one second received point-to-point SMS type message to said identification card so that said card generates specific commands that will order its mobile terminal to send said audio alarm signal and to display said alarm text message.

11. The method according to claim 7, wherein said second identifiers of said mobile terminals and routing information necessary to reach these terminals are determined from said client information database in a single operation, using a second point-to-point SMS type message starting from said first identifiers of said mobile terminals.

12. A radio network controller for a radio access network of a radio communication network, configured to control mobile terminal communications located in radio cells (Cjk), the radio network controller comprising a processing module that is configured to, following reception of a first short message service-cell broadcast (SMS-CB) type alarm message associated with a chosen alarm class of a chosen level from an alarm center containing an alarm text message and intended for mobile terminals located in at least one chosen cell that said controller controls, immediately interrupt transmission of at least one SMS-CB type message associated with a class with a level lower than the chosen alarm class of the first received SMS-CB message to mobile terminals located in at least one chosen cell and release resources, so that said first message can be broadcast to mobile terminals that are located in at least one chosen cell that said controller controls, and wherein at least some of these mobile terminals emit an audio alarm signal and display the alarm text message contained in said first message.

13. The radio network controller according to claim 12, wherein said processing module is configured to resend a first message a chosen number of times.

14. The radio network controller according to claim 12, wherein said processing module is configured to, during a first attempt to transmit a SMS-CB type message, release radio resources used by the mobile terminals involved in a communication and located in one or more chosen cells that said controller controls, so as to force these mobile terminals to change to idle mode.

15. The radio network controller according to claim 12, wherein said processing module is configured so that following failure of the attempt to transmit a first SMS-CB message to the mobile terminals that have set up a communication with said network and are located in a chosen cell that said controller controls, to determine the first identifiers for said mobile terminals, then to generate a second point-to-point SMS type message, containing an alarm text message starting from said first message, then to determine a second communication identifier for said detected mobile terminals starting from said first identifiers, and to transmit said second message to said detected mobile terminals so that the alarm text message that it contains can be displayed on the screen of said detected mobile terminals.

16. The radio network controller according to claim 12, wherein said processing module is configured so that, following failure of the transmission of a first SMS-CB type message to mobile terminals that have set up a communication with said network and that are located in a chosen cell that said controller controls, to determine the first identifiers for said mobile terminals, then to transmit said first identifiers to said alarm center so that it generates a second point-to-point SMS type message and that it transmits this second message to said detected mobile terminals after having determined second communication identifiers for said detected mobile terminals, starting from their corresponding first identifiers.

17. An alarm center (CA), comprising a processing module configured to transmit a first SMS-CB type message to controllers of the chosen radio network, according to claim 12, and in case of reception of first identifiers from mobile terminals that could not be reached by said first SMS-CB type message from at least one of said radio network controllers, to generate a second point-to-point SMS type message then transmit this message to said mobile terminals that could not be reached, after determining second point-to-point SMS communication identifiers for these mobile terminals starting from their first corresponding radio identifiers.

* * * * *